United States Patent [19]

Hagar

[11] Patent Number: 4,817,667

[45] Date of Patent: Apr. 4, 1989

[54] METERING REGULATOR FOR PNEUMATIC TOOLS

[75] Inventor: Jack L. Hagar, Pinehurst, Tex.

[73] Assignee: Dresser Industries, Inc., Dallas, Tex.

[21] Appl. No.: 151,837

[22] Filed: Feb. 3, 1988

[51] Int. Cl.$^4$ .............................................. F16K 31/12
[52] U.S. Cl. ................................ 137/613; 137/505.18; 251/344; 251/345
[58] Field of Search ................... 137/505, 505.18, 613; 251/344, 345

[56] References Cited

U.S. PATENT DOCUMENTS

| | | | |
|---|---|---|---|
| 2,608,209 | 8/1952 | Bryant | 137/501 |
| 2,951,501 | 9/1960 | Thylefors | 137/501 |
| 3,005,468 | 10/1961 | Erwin et al. | 251/344 |
| 3,351,086 | 11/1967 | Baker | 137/501 |
| 3,788,063 | 1/1974 | Snider | 251/345 |
| 4,484,598 | 11/1984 | Reiffert et al. | 137/505.18 |

*Primary Examiner*—A. Michael Chambers
*Attorney, Agent, or Firm*—Roy L. Van Winkle; William R. Peoples; Edward R. Fiorito

[57] ABSTRACT

A metering regulator for air tools which includes a ported sleeve adjustable to control the volume of air flowing therethrough while simultaneously controlling the shut-off pressure of the air tool by adjusting the biasing force exerted on a differential pressure actuated pressure regulating member.

6 Claims, 2 Drawing Sheets

METERING REGULATOR FOR PNEUMATIC TOOLS

BACKGROUND OF THE INVENTION

This invention relates generally to a metering regulator. More specifically, but not by way of limitation, this invention relates to a compact metering regulator that can be installed in or attached to individual pneumatic tools for controlling the volume and pressure of air flowing to the motor of each pneumatic tool.

In the past, separate devices were required for metering or controlling the volume of air flowing to air tools and for regulating the pressure at which the tools stop. Pneumatic tools, such as nutrunners, generally operate on the principle that when the torque on the threaded fastener reaches a certain value, it will be reflected as a pressure in the tool and at some predetermined pressure, depending on the torque desired on the nut, the tool will stall and stop. This is generally accomplished by a pressure regulator which may be installed in the tool or separate therefrom. It is, of course, desirable to have the pressure regulator as accurate as possible to promote the consistent torque application to the threaded fasteners.

The volume of air flowing into the tool can also affect the torque applied to the threaded fastener. This occurs due to the kinetic energy being imparted to the threaded joint by a rapidly spinning motor due to with a high volume flow into the pneumatic tool.

Air flow control allows the free speed RPM of a tool to be reduced with a minimal reduction in stall torque. Air pressure control allows the stall torque of a tool to be reduced with a minimal reduction in free speed. Air pressure regulation is the preferred method for controlling torque on threaded joints with moderate variations in torque rates. Pressure control reduces torque scatter caused by varying air pressure. Air flow control can lower the torque spread between torque rates. Air flow restrictions can reduce motor speeds with minimal stall torque loss. This can significantly reduce the kinetic energy imparted to a threaded joint with a high torque rate and have little or no effect on a joint with a low torque rate.

Accordingly, it is desirable to b able to control both the pressure at stall, that is to regulate the pressure where the tool stops, as well as to be able to simultaneously control the volume of flow so that the tool will be operating at the optimum possible speed consistent with the ability to apply the desired torque. The combination of controls provides the best consistency of response to the desired torque.

An object of this invention is to provide a compact metering regulator which simultaneously provides both the control of the volume of air flowing into the motor and the control of the pressure at which the tool stalls or shuts off.

SUMMARY OF THE INVENTION

This invention provides a compact metering regulator that includes a tool body which can be attached to or located in the pneumatic tool, a volume metering means that is located within the body and pressure regulating means located within the volume metering means. The arrangement is such that the volume flowing through the metering regulator is controlled simultaneously with the regulation of the pressure as mentioned above.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
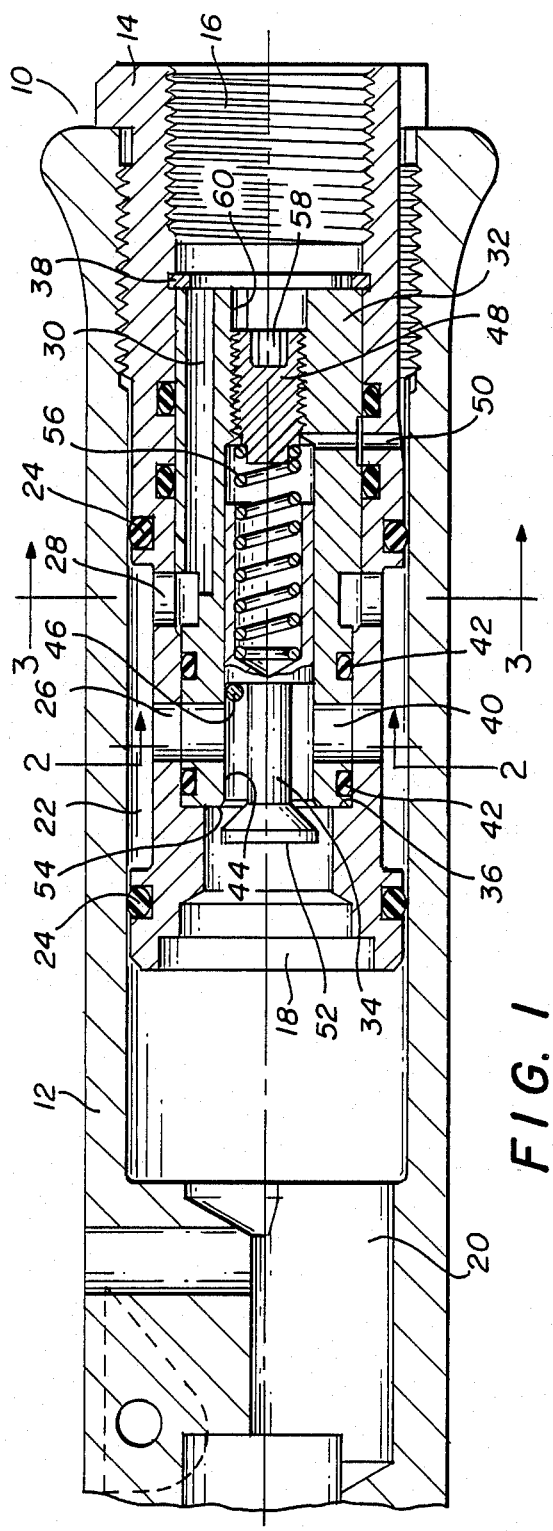
FIG. 1 is a cross-sectional view illustrating one embodiment of metering regulator that is constructed in accordance with the invention that is located in the handle of a partially illustrated pneumatic tool.
Figure 3:
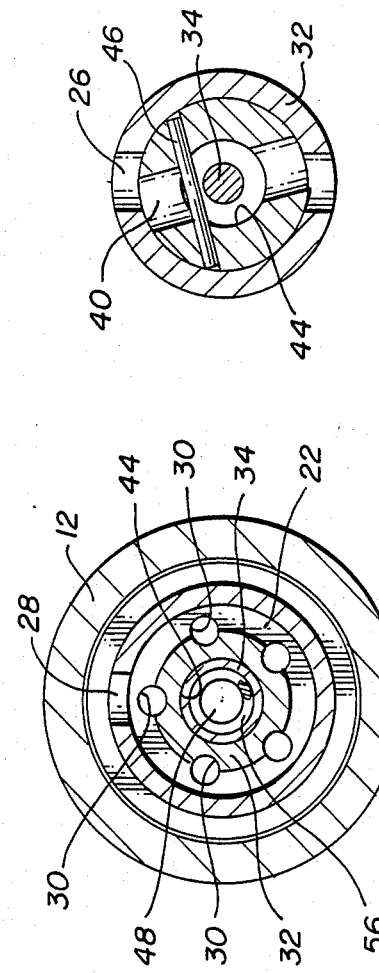
FIG. 3 is a transverse cross-sectional view taken generally along the line 3—3 of FIG. 1.

Referring to the drawing and to FIGS. 1-4 in particular, shown therein and generally designated by the reference character 10 is a metering regulator that is constructed in accordance with the invention. The regulator 10 is illustrated as being threaded into the handle of a partially illustrated pneumatic tool 12.

The metering regulator 10 includes a tool body 14 of generally tubular construction that has an inlet 16 arranged to be connected with a source of pressurized air and an outlet 18 that is located in communication with a series of passageways 20 leading to the motor (not shown) of the air tool 12. An annular space 22 between the body 14 and handle is in sealed relationship to the handle of the air tool 12 due to spaced 0-rings 24. The space 22, port 26 and second ports 28 along with a passageway 30 that extends through a metering sleeve 32 comprise an air supply passageway from the inlet 16.

The metering sleeve 32 is located coaxially with respect to the body 14. Coaxially located within the metering sleeve 32 is a pressure regulator member 34 which will be described in detail hereinafter. The sleeve 32 is retained within the body 14 between a shoulder 36 adjacent to the outlet 18 and an internal lock ring 38 that is disposed adjacent to the inlet 16.

A plurality of volume control ports 40 extend radially through the sleeve 32. The ports 40 are arranged, when the sleeve 32 is in the maximum flow position, to be aligned with the ports 26 in the body 14. Spaced seals 42, located on each side of the ports 26, limit the flow from the passageway 30 through the ports 40.

As illustrated, the sleeve 32 includes a bore 44 sized to closely receive the pressure regulating member 34. The pressure regulating member 34 is retained in the bore 44 between a stop pin 46 and an adjusting member 48 that is threaded into the sleeve 32.

A vent port 50 extends through the body 14 and the sleeve 32 into the bore 44 thereof. The arrangement of the vent port 50 is such that the bore 44 on the end of the pressure regulating member 34 adjacent to the inlet 16 will be ambient or atmospheric pressure, thereby providing a pressure differential across the pressure regulating member 34.

The pressure regulating member 34 includes an enlarged head 52 which is larger in diameter than the diameter of the bore 44 so that the head 52, when moved to the right as seen in FIG. 1, can engage a seat 54 formed by the sleeve 32 to shut off the flow through the metering regulator 10.

The pressure regulating member 34 is resiliently biased toward the position illustrated in FIG. 1 by a coil spring 56 which has one end in engagement with the pressure regulating member 34 and the other end in engagement with the adjusting member 48. The adjusting member 48 is provided with a polygonal recess 58 so that a tool (not shown) can be inserted through the inlet 16 to rotate the adjusting member 48, changing the force exerted by the spring 56 on the pressure regulating member 34. Similarly, the sleeve 32 is provided with a polygonal recess 60 in the end thereof adjacent to the inlet 16 so that a tool can be inserted through the inlet 16 to rotate the sleeve 32 to control the volume flowing through the metering regulator 10, as will be explained.

OPERATION OF THE PREFERRED EMBODIMENT

With an air supply connected to the inlet 16, pressurized air flows through the passageway 30 through the port 28, the annular space 22, port 26 and through the ports 40 into the bore 44 of the sleeve 32. So long as the pressure regulating member 34 is positioned as illustrated in FIG. 1, air will flow through the outlet 18 and into the passageway 20 leading to the motor of the air tool 12. If the air tool 12 is attached to a threaded fastener, pressure increases in the passageways 20 as the fastener tightens, exerting a force on the pressure regulating member 34 moving it to the right against the resilient bias of the spring 56 controlling air pressure.

Figure 4:
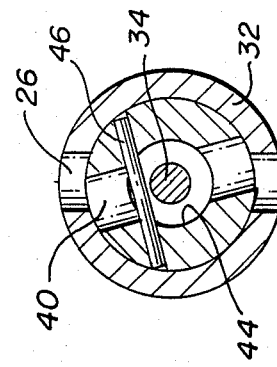
FIG. 4 is a view similar to FIG. 2, but illustrating the volume metering means of the metering regulator of FIG. 1 in another operating position.
Figure 2:
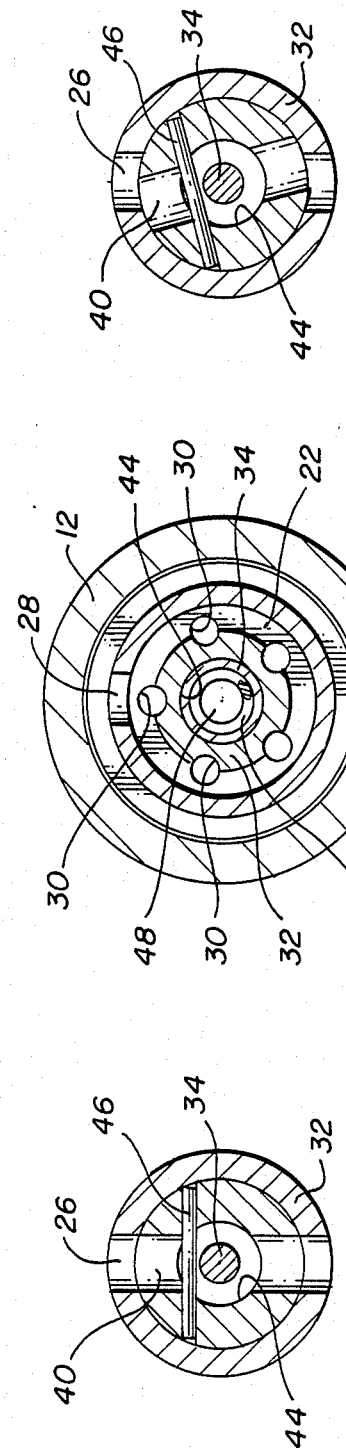
FIG. 2 is a transverse cross-sectional view taken generally along the line 2—2 of FIG. 1.

Previously, an adjusting tool (not shown) has been inserted into the recess 60 rotating the sleeve 32 to a position wherein the desired volume of air is flowing through the metering regulator 10. Such a position is illustrated in FIG. 4 where it can be seen that the cross-sectional area of the volume metering ports 40 has been reduced due to their misalignment with the ports 26. Accordingly, less air flows through the metering regulator 10 to the motor (not shown).

When the pressure in the outlet 18 drops, the spring 56 will urge the valve control means 34 to the left and again into the position illustrated in FIG. 1. At this point, air can flow through the metering regulator 10 in the volume and pressure desired to operate the air tool 12.

BRIEF DESCRIPTION OF THE EMBODIMENT OF FIG. 5

Figure 5:
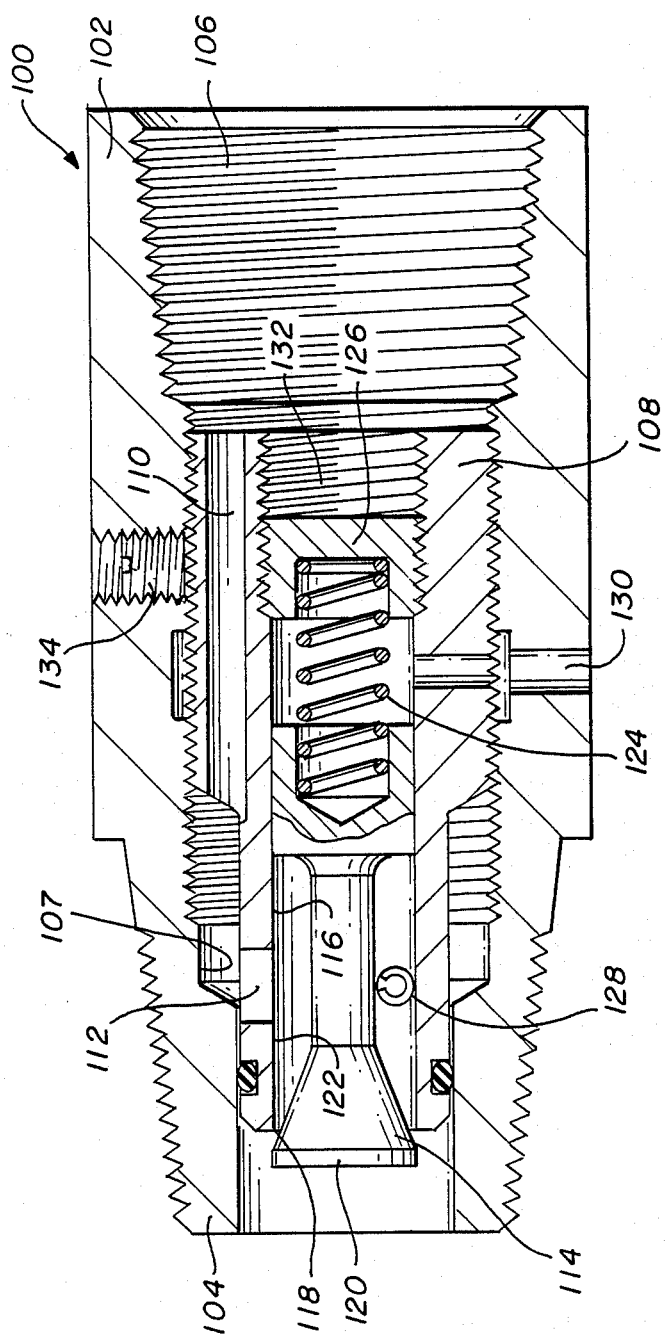
FIG. 5 is another embodiment of metering regulator that is also constructed in accordance with the invention.

FIG. 5 illustrates another embodiment of metering regulator that is generally designated by the reference character 100 and that may also be used in connection with an air tool such as the air tool 12. The metering regulator 100 includes a generally tubular body 102 that includes threads on the outlet end 104 which will be suitable for attachment to the air tool. The tubular body 102 is also threaded at an inlet end 106 for connection to a pressurized air supply and has a partially threaded bore 107.

A volume control sleeve 108 is threadedly located within the body 102 and includes a flow passageway 110 that extends therethrough from the inlet 106. The other end of the passageway 110 is open to the bore 107 in the body 102. The sleeve 108 also includes a plurality (only one is shown) of ports 112 that extend radially therethrough and that are in fluid communication with the bore 107.

Coaxially located within the sleeve 108 is a pressure regulating member 114 that is located within a bore 116 in the sleeve 108. The bore 116 forms an annular seat 118 that is adjacent to a enlarged head portion 120 on the pressure regulating member 114. The pressure regulating member 114 fits closely within the bore 116 in the sleeve 108 and is slidable axially therein.

The pressure control member 114 is resiliently biased or urged toward an open position by a spring 124 that has one end engaging the end of the pressure regulating member 114 adjacent to the inlet 106. The other end of the spring 124 is in engagement with an adjustable member 126. The member 126 is threadedly connected to the interior of the sleeve 108 so that the force which the spring 124 exerts on the pressure regulating member 114 can be adjusted as discussed in connection with the metering regulator 10. To prevent the pressure regulating member 114 from being pushed out of the bore 116 by the spring 124, a retainer pin 128 extends across the bore 116.

A pressure differential across the pressure regulating member 114 is provided by a vent port 130 that extends through the body 102, through the sleeve 108, and into the bore 116, assuring that the bore 116 and the end of the pressure regulating member 114 will be at atmospheric pressure.

Adjustment of the member 126 is provided by a polygonal recess or a slot 132 formed in the end of the adjusting member 126 adjacent to the inlet 106 and accessible therethrough. Similarly, the sleeve 108 is provided with spanner ports or the like (not shown) which permit rotation of the sleeve 108 relative to the body 102. To prevent inadvertent rotation of the sleeve 108, a set screw 134 extends through the body 102 into engagement with the exterior of the sleeve 108.

OPERATION OF THE EMBODIMENT OF FIG. 5

With the metering regulator 100 attached to the tool 12, and an air supply connected to the inlet 106 thereof, air can flow through the passageways 110 into the bore 107 and through the volume metering ports 112 formed in the sleeve 108. Passing through the ports 112, the air flows into the bore 116 past the head 120 of the pressure regulating member 114 when the pressure regulating member 114 is in the position as illustrated. The motor (not shown) of the tool 12 begins operating, and as torque is applied to a threaded fastener, pressure increases in the outlet 104 applying a force to the head 120 and, due to the pressure differential across the pressure regulating member 114, moving that member to control the air pressure.

As was true with the metering regulator 10, the metering regulator 100 can also control the volume flowing therethrough. This is accomplished by rotating the sleeve 108 so that the sleeve 108 moves longitudinally moving the ports 112 into a position misaligned with the bore 107 in the body 102 and thereby reducing the cross-sectional flow area of the ports 112, and thereby restricting the flow therethrough.

From the foregoing, it will be appreciated that two versions of very compact metering regulators have been described. Each can be used advantageously with air tools due to their small size and due to their ability to control both the pressure and the volume of air flowing therethrough. Each function can be easily regulated as previously described. Also, the use of the metering regulators in air tools provides the additional advantage when a number of tools are being utilized. Appropriate settings can be made on the metering regulator in each individual tool, thus eliminating the requirement for a separate air supply for each tool.

From the foregoing, it will be appreciated that only two embodiments have been described in detail, and that many changes and modifications can be made thereto without departing from the spirit or scope of the invention.

What is claimed is:

1. An air metering regulator for installation in pneumatic tools comprising:
   a generally tubular body having inlet and outlet ends and connected to the tool, said body having an air supply passageway therein extending from said inlet end;
   a volume metering sleeve having an outlet and having a metering port therein, said port located in communication with said air supply passageway and said sleeve moveably located within said body for varying the area of said port in communication with said passageway to correspondingly vary the volume of air flowing through said passageway and port to the outlet end of said body;
   a pressure regulator member located within said sleeve having a first end projecting from the outlet thereof, an intermediate portion of reduced diameter, and a second end portion closely fitting into said sleeve, said first end being larger than and engageable with said outlet, said pressure regulating member being moveable from an open position toward a closed position in response to pressure in the outlet of said body; and,
   biasing means for urging said pressure regulating member toward said open position in opposition to the pressure in the outlet of said body, whereby pressure in the outlet exerts a force on said pressure regulating member equal to the force exerted by said biasing means moving said pressure regulating member toward said restricted position thereby limiting the air pressure in the outlet of said body.

2. The air metering regulator of claim 1 wherein said volume metering sleeve is rotatable relative to said body to vary the area of the air control inlet port in communication with said passageway.

3. The air metering regulator of claim 7 wherein said volume metering sleeve is longitudinally moveable relative to said body to vary the area of the air control port in communication with said passageway.

4. The air metering regulator of claim 7 and also including:
   a vent opening extending through said body; and,
   a vent port in said volume metering sleeve in communication with said vent opening and located adjacent to the second end of said pressure regulating member whereby the pressure acting on said second end is at atmospheric.

5. The air metering regulator of claim 2 wherein said biasing means also includes:
   an adjusting member threadedly connected to said sleeve; and,
   a comparison spring located within said sleeve and having one end engaging said pressure regulating member and the other end engaging said adjusting member whereby the force exerted on said pressure regulating member can be varied by adjusting the position of said adjusting member in said sleeve.

6. The air metering regulator of claim 5 and including:
   a first polygonal recess in the interior end of said sleeve adjacent to said adjusting member, said first polygonal recess provided for steering the rotational position of said sleeve relative to said body; and,
   a second polygonal recess in said adjusting member smaller than said first polygonal recess for rotating said adjusting member relative to said sleeve to vary the force exerted by said spring on said pressure regulating member.

* * * * *